United States Patent Office 2,784,179
Patented Mar. 5, 1957

2,784,179

METALLIFEROUS AZO-DYESTUFFS

Christian Zickendraht, Binningen, and Arthur Buehler, Rheinfelden, Switzerland, assignors to Ciba Limited, Basel, Switzerland No Drawing. Application July 14, 1952, Serial No. 298,831

10 Claims. (Cl. 260—147)

According to this invention valuable new metalliferous azo-dyestuffs are made by treating a monoazo-dyestuff which is free from sulfonic acid and carboxylic acid groups, and corresponds to the general formula (1)
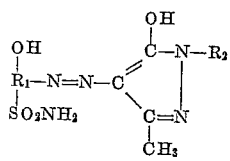

in which $R_1$ represents a benzene radical bound to the azo linkage in ortho-position relatively to the hydroxyl group, and $R_2$ represents a benzene radical, and in which at least one of the radicals $R_1$ and $R_2$ contains an aliphatic group or a halogen atom, with an agent yielding cobalt or chromium in such manner that the resulting metalliferous dyestuff contains, per molecule of monoazo dystuff, less than one atom of cobalt or chromium in complex union.

The monoazo-dyestuffs of the above formula used as starting materials can be made by coupling an ortho-hydroxy-diazo-compound of the benzene series which is free from sulfonic acid and carboxylic acid groups and contains an unsubstituted sulfonic acid amide group, with a 1-phenyl-3-methyl-5-pyrazolone, which may contain an aliphatic group or a halogen atom as a substituent in the phenyl group.

Especially valuable as starting materials for the present process are monoazo-dyestuffs of the Formula 1, which contain in the radical $R_2$ an aliphatic group or advantageously a halogen atom. Valuable starting materials are also products of the Formula 1, in which $R_2$ represents an unsubstituted phenyl group and the radical $R_1$ contains, in addition to the hydroxyl group and —$SO_2NH_2$-group, an aliphatic group or advantageously a halogen atom, for example, a chlorine atom.

As ortho-hydroxy-diazo-compounds of the benzene series which contain a sulfonic acid amide group there come into consideration as starting materials for the present process, for example, diazo-compounds of the following ortho-hydroxy-amines:

(a) 6-chloro-2-amino-1-hydroxy-benzene - 4 - sulfonic acid amide, and also 4-chloro-2-amino-1-hydroxy-benzene-5- or -6-sulfonic acid amide, 4-methyl-2-amino-1-hydroxy-benzene-5- or -6-sulfonic acid amide, and especially (b) 2-amino-1-hydroxy-benzene-4- or -5-sulfonic acid amide.

The two last-mentioned components are coupled exclusively with 1-phenyl-3-methyl-5-pyrazolones which contain as a substituent in the phenyl group an aliphatic group or a halogen atom.

As coupling components there come into consideration, on the one hand, 1-phenyl-3-methyl-5-pyrazolones which are substituted in the phenyl-group as indicated above, such as 1-(3'- or 4'-methyl phenyl)-3-methyl-5-pyrazolone, 1-(4'-tertiary amyl-phenyl)-3-methyl-5-pyrazolone, 1-(3'-trifluoromethylphenyl) - 3 - methyl - 5 - pyrazolone, 1-(2':5'-dichlorophenyl)-3-methyl-5-pyrazolone, 1-(2':5'-dibromophenyl)-3-methyl-5-pyrazolone, and 1-(2'-chlorophenyl) - 3 - methyl - 5 - pyrazolone, 1-(2'- or 4'-fluorophenyl)-3-methyl-5-pyrazolone, 1-(2'-trifluoromethyl-4'-chlorophenyl)-3-methyl - 5 - pyrazolone, 1-(3'-trifluoromethyl-6'-chlorophenyl)-3-methyl-5-pyrazolone. Especially valuable is 1-(3'- or 4'-chlorophenyl)-3-methyl-5-pyrazolone. On the other hand, there may be used as coupling component 1-phenyl-3-methyl - 5 - pyrazolone itself, but it is to be coupled only with the diazo-components mentioned under (a) above, and especially with diazotized 4-chloro-2-amino-1-hydroxybenzene-5- or -6-sulfonic acid amide.

The coupling of the ortho-hydroxy-diazo-compounds with the pyrazolones can be carried out by the usual known methods, for example, in a weakly acid to alkaline medium.

After the coupling reaction, for the purpose of metallization the dyestuffs can easily be separated from the coupling mixture, if desired after the addition of sodium chloride, by filtration since they are only slightly soluble in water. They are advantageously used in the form of filter cakes without any intermediate drying prior to metallization. In some cases it is possible to carry out the metallization directly in the coupling mixture without any intermediate separation.

The monoazo-dyestuffs obtainable as described above and serving as starting materials are in general sufficiently soluble in water in the form of their alkali compounds to dye well from dyebaths which need contain no acid, for example, by the single bath chroming process.

The treatment with an agent yielding cobalt or chromium is carried out in accordance with the present invention in such manner that a metalliferous dyestuff is obtained which contains, per molecule of monoazo-dyestuff, less than one atom of cobalt or chromium in complex union. Accordingly, the metallization is advantageously carried out with such agents yielding cobalt or chromium and by such methods as lead to complex metal compounds having the required constitution. In general it is of advantage to use a quantity of the agent yielding cobalt or chromium containing less than one atomic proportion of cobalt or chromium per molecular proportion of dyestuff and/or to conduct the metallization in a weakly acid to alkaline medium. Those agents yielding cobalt or chromium which are stable towards alkaline agents are therefore especially suitable for carrying out the process, for example, complex cobalt or chromium compounds of aliphatic hydroxy-carboxylic acids or dicarboxylic acids, or more especially complex chromium compounds of aromatic ortho-hydroxy-carboxylic acids. As examples of aliphatic hydroxy-carboxylic acids and dicarboxylic acids there may be mentioned, inter alia, oxalic acid, lactic acid, glycollic acid, citric acid and especially tartaric acid, and among the aromatic ortho-hydroxy-carboxylic acids, for example, those of the benzene series, there may be mentioned 4-, 5- or 6-methyl-1-hydroxybenzene-2-carboxylic acid and above all 1-hydroxybenzene-2-carboxylic acid itself. As agents yielding cobalt there are especially suitable, however, simple compounds of divalent cobalt such as cobalt sulfate or cobalt acetate, and, if desired, freshly precipitated cobalt hydroxide.

Conversion of the dyestuffs into complex cobalt or chromium compounds is advantageously carried out at a raised temperature, under atmospheric or superatmospheric pressure, for example, at the boiling temperature of the reaction mixture, if desired, in the presence of suitable additions, for example, in the presence of salts of organic acids, of bases, organic solvents or other agents capable of assisting the formation of complexes.

A special form of the process consists in starting from mixtures of two different metallizable monoazo-dyestuffs, each of which corresponds to the above general Formula 1 or of which one corresponds to that formula and the other is an ortho:ortho'-dihydroxy-monoazo-dyestuff of the benzene-azo-naphthalene series free from sulfonic acid and carboxylic acid groups.

The ortho:ortha'-dihydroxy-monoazo-dyestuffs of the benzene-azo-naphthalene series, which come into consideration for use in the form of the process last-mentioned, can be obtained by coupling ortho-hydroxy-diazo-compounds of the benzene series free from sulfonic acid and carboxylic acid groups with hydroxy-naphthalenes capable of coupling in a position vicinal to a hydroxyl group and also free from sulfonic acid and carboxylic acid groups. As examples of ortho-hydroxy-diazo-compounds of the benzene series there may be mentioned those obtainable from the following amines: 4- or 5-nitro-2-amino-1-hydroxybenzene, 4- or 5-chloro-2-amino-1-hydroxybenzene, 6-acetyl amino - 4-nitro-2-amino-1-hydroxybenzene, 4-acetyl - amino - 6-nitro-2-amino-1-hydroxybenzene, 2-amino-1 - hydroxybenzene-4-methyl sulfone, 2-amino-1-hydroxybenzene-4- or 5-sulfonic acid-N-methyl-, -N-ethyl-, -N-β-hydroxyethyl- or -N-phenylamide and the ortho-hydroxy-amines mentioned above. As hydroxy-naphthalenes there come into consideration α-naphthols such, for example, as 5-chloro-1-hydroxy - naphthalene, 5:8-dichloro - 1-hydroxy-naphthalene and above all β-naphthols such, for example, as 2-hydroxynaphthalene, 6-bromo-2 - hydroxynaphthalene, 1-acetyl-, 1-butyryl- or 1-benzoyl-amino-7-hydroxynaphthalene and 6- or 7-methoxy-2-hydroxynaphthalene.

In this form of the process the treatment with an agent yielding metal must of course be carried out in such manner that a metalliferous dyestuff is obtained which contains in complex union less than one atom of metal per molecule of monoazo-dyestuff.

The dyestuffs of the invention, especially the chromiferous dyestuffs, can also be made by another, and indeed somewhat more complicated, form of the process, in which a chromium compound of a monoazo-dyestuff containing one atom of chromium bound in complex union per molecule of dyestuff (a 1:1-complex) is reacted with a metal-free monoazo-dyestuff, and the metal-free and chromiferous monoazo-dyestuffs used are both free from sulfonic acid and carboxylic acid groups, and either both correspond to the general Formula 1 above or one of them corresponds to that formula and the other is an ortho:ortho'-dihydroxy-monoazo-dyestuff of the benzene-azo-naphthalene series.

In this form of the process the starting materials may be so chosen that either the monoazo-dyestuff present in the complex chromium compound (1:1-complex) or the metal-free dyestuff or both correspond to the general Formula 1.

The 1:1-complexes containing chromium used in this form of the process can be made by methods in themselves known, for example, by reacting the monoazo-dyestuff free from complex-forming metal in an acid medium with an excess of a salt of trivalent chromium, for example, chromium formate or chromium sulfate, at the boiling temperature, or, if desired, at a temperature above 100° C. and in the presence of a solvent such as alcohol. In this case there may be used as starting material an ortho:ortho'-dihydroxy-monoazo-dyestuff of the constitution given above or a corresponding ortho-alkoxy-ortho'-hydroxy-monoazo-dyestuff. In the latter case the chroming is carried out under conditions such that the alkyl group is split off from the ortho-alkoxy-ortho'-hydroxy-azo-grouping.

The reaction of the 1:1-complex so obtained with the metal-free dyestuff is advantageously carried out by working in a neutral to alkaline aqueous medium at ordinary temperature or a raised temperature.

In order to obtain according to the latter form of the process 1:2-complexes which are distinguished especially by their good solubility it is generally of advantage to react together approximately equimolecular quantities of the metalliferous dyestuff (1:1-complex) and the metal-free dyestuff.

The products of the invention are new. They are cobalt or chromium compounds which contain two monoazo-dyestuffs united in a complex in which the ratio of the number of cobalt or chromium atoms bound in complex union to the number of monoazo-dyestuff molecules bound to the cobalt or chromium is smaller than 1:1, and is advantageously about 1:2, and in which the two monoazo-dyestuffs are ortho:ortho'-dihydroxy-monoazo-dyestuffs free from sulfonic acid and carboxylic acid groups, and one of which dyestuffs corresponds to the general Formula 1 above and the other of which is of the benzene-azo-naphthalene series or also corresponds to the Formula 1.

The new cobaltiferous and chromiferous dyestuffs are soluble in water and in a weakly acid aqueous medium, and are in fact more soluble than the initial metal-free dyestuffs used in making them. They are suitable for dyeing or printing a very wide variety of materials, and especially for dyeing animal materials such as silk, leather and especially wool, or for dyeing or printing synthetic fibers of superpolyamides or superpolyurethanes. In contradistinction to the chromium compounds of dyestuffs which contain sulfonic acid groups and are advantageously applied in dyeing from strong acid, for example, sulfuric acid baths, the new metal compounds of monoazo-dyestuffs free from sulfonic acid groups are principally suitable for dyeing from weakly alkaline to neutral to weakly acid, and advantageously acetic acid, baths. There may, of course, be added to the dyebath the usual auxiliary substances used in dyeing wool, such as sodium sulfate, sodium pyrophosphate, alkylene oxide condensation products and the like. The wool dyeings so obtained are distinguished by their level character and very good fastness to light and very good properties of wet fastness, such as a very good fastness to washing and fulling. The dyeings are also very fast to decatizing and carbonizing.

The following examples illustrate the invention, the parts and percentages being by weight unless otherwise stated and the relationship of parts by weight to parts by volume being the same as that of the kilogram to the liter:

*Example 1*

18.8 parts of 2-amino-1-hydroxybenzene-4-sulfonic acid amide are dissolved in 50 parts of water and 14 parts of hydrochloric acid of 30 percent strength, then mixed with ice, and diazotized at 0–5° C. with an aqueous solution of 6.9 parts of sodium nitrite. The diazo-suspension is neutralized with sodium carbonate and poured at 10–12° C. into a solution of 22 parts of 1-(4'-chlorophenyl)-3-methyl-5-pyrazolone, 50 parts of water and 14.0 parts of sodium hydroxide solution of 30 percent strength. Coupling proceeds very rapidly. The dyestuff is completely precipitated by the addition of sodium chloride. The dyestuff paste obtained by filtration is stirred in 250 parts of water, and mixed with 120 parts of a solution of sodium-potassium chromo-salicylate having a chromium content of 2.6 percent and 6.7 parts of sodium hydroxide solution of 30 percent strength. The whole is boiled under reflux for 3 hours. At the end of this period chroming is finished, 13 parts of sodium hydroxide solution of 30 percent strength are added, whereupon complete dissolution occurs, and the whole is evaporated in vacuo. The resulting dyestuff is the complex chromium compound containing one atom of chromium in complex union with substantially two molecules of the monoazo-dyestuff of the formula

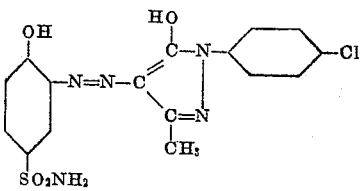

It is a red-brown powder which dissolves easily in water with an orange-red coloration and dyes wool from a neutral or acetic acid bath orange tints of very good fastness to light and washing.

By using instead of 2-amino-1-hydroxybenzene-4-sulfonic acid amide, 2-amino-1-hydroxybenzene-5-sulfonic acid amide there is obtained by the process of this example the complex chromium compound containing one atom of chromium in complex union with substantially two molecules of the monoazo-dyestuff of the formula

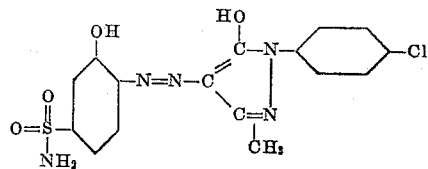

which dyes wool from neutral or acetic acid baths pure scarlet tints having very good properties of fastness.

The solution of sodium-potassium chromosalicylate is prepared by boiling 362 parts of an aqueous solution of chromic sulfate having a chromium content of 7.2 percent with 138 parts of salicylic acid, dissolving the resulting chromosalicylic acid by the addition of 166 parts of sodium hydroxide solution of 30 percent strength and a sufficient quantity of potassium hydroxide solution of 37 percent strength to produce a reaction distinctly alkaline to phenolphthalein, and making up the mixture with water to 1000 parts.

*Example 2*

A dyestuff paste (moist filter cake) obtained by coupling the diazo-compound prepared from 1.88 parts of 2-amino-1-hydroxybenzene-4-sulfonic acid amide with 2.2 parts of 1 - (4'-chlorophenyl)-3-methyl-5-pyrazolone is suspended in 100 parts of water and dissolved by the addition of 5 parts by volume of a 2 N-solution of sodium hydroxide and heating. The dyestuff solution at a temperature of about 80° C. is mixed with 1.5 parts of crystalline sodium acetate, and then with 30 parts of a cobalt sulfate solution at a temperature of 70° C. and having a cobalt content of 1.3 percent. After a short time the formation of the complex is complete and the cobalt compound of the dyestuff can be precipitated by the addition of sodium chloride and dilute acetic acid. The dry dyestuff is a brown powder which dyes wool and superpolyamide fibers brownish-yellow tints which are very fast to light.

*Example 3*

11.1 parts of 4-chloro-2-amino-1-hydroxybenzene-5-sulfonic acid amide are dissolved in 50 parts of water and 12 parts of hydrochloric acid of 30 percent strength, and diazotized at 0–5° C. with a solution of 3.45 parts of sodium nitrite in 12 parts of water. The neutralized diazo-suspension is introduced together with a solution of 8.7 parts of 1-phenyl-3-methyl-5-pyrazolone into 100 parts of water and 6.7 parts of sodium hydroxide solution of 30 percent strength. The whole is stirred at 10–12° C. until the diazo-compound can no longer be detected.

The resulting dyestuff is filtered off and the dyestuff paste so obtained is dissolved in 300 parts of water and 6.7 parts of sodium hydroxide solution of 30 percent strength. After the addition of 60 parts of a solution of sodium chromosalicylate having a chromium content of 2.6 percent, the whole is boiled for 3 hours under reflux. At the end of this period the chroming is complete. The dyestuff which is the complex chromium compound containing one atom of chromium in complex union with substantially two molecules of the monoazo-dyestuff of the formula

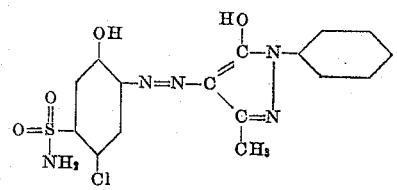

is isolated by evaporating the solution in vacuo. It is a brown-red water-soluble powder which dissolves in concentrated sulfuric acid with a yellow coloration and in a sodium carbonate solution with a red coloration, and dyes wool from a neutral or acetic acid bath red tints of good fastness properties.

By dissolving the above described metal-free dyestuff in 300 parts of water and 13.3 parts of sodium hydroxide solution of 30 percent strength there is obtained, after the addition of 150 parts of cobalt sulfate solution having a cobalt content of 1.3 percent and heating at 80–85° C. for ½ hour, the cobalt compound of the dyestuff. It dyes wool from a neutral or acetic acid bath brown-orange tints having good properties of fastness.

Similar dyestuffs which die wool the tints given in column IV of the following table are obtained by treating by the methods described above the monoazo-dyestuffs, obtainable from the diazo- and coupling-components given in columns I and II, with an agent capable of yielding the metal indicated in column III.

|    | I | II | III | IV |
|---|---|---|---|---|
| 1 | 2 - Amino - 1 - hydroxybenzene-4-sulfonic acid amide. | 1 - (3' - Chlorophenyl)-3-methyl-5-pyrazolone. | Cr | orange. |
| 2 | ----do---- | 1-(2'-chlorophenyl)-3-methyl-5-pyrazolone. | Cr | Do. |
| 3 | ----do---- | 1-(2':5'-Dichlorophenyl)-3-methyl-5-pyrazolone. | Cr | Do. |
| 4 | ----do---- | 1-(4'-Methyl-phenyl)-3-methyl-5-pyrazolone. | Cr | Do. |
| 5 | ----do---- | ----do---- | Co | yellow-brown. |
| 6 | 2-Amino-1-hydroxybenzene-5-sulfonic acid amide. | 1-(4'-Chlorophenyl)-3-methyl-5-pyrazolone. | Co | orange-brown. |
| 7 | 4-Chloro-2-amino-1-hydroxybenzene-5-sulfonic acid amide. | ----do---- | Cr | red. |
| 8 | ----do---- | ----do---- | Co | brown-orange. |
| 9 | 4-Chloro-2-amino-1-hydroxybenzene-6-sulfonic acid amide. | ----do---- | Cr | orange-red. |
| 10 | ----do---- | ----do---- | Co | brown yellow. |
| 11 | ----do---- | 1-Phenyl-3-methyl-5-pyrazolone. | Cr | orange-red. |
| 12 | ----do---- | ----do---- | Co | brown-yellow. |
| 13 | 2-Amino-1-hydroxybenzene-4-sulfonic acid amide. | 1-(4'-Bromophenyl)-3-methyl-5-pyrazolone. | Cr | orange. |
| 14 | ----do---- | ----do---- | Co | brown-yellow. |
| 15 | ----do---- | 1-(4'-fluorophenyl)-3-methyl-5-pyrazolone. | Cr | orange. |
| 16 | ----do---- | 1-(3'-trifluoromethyl-phenyl)-3-methyl-5-pyrazolone. | Cr | Do. |

Example 4

20.4 parts of the dyestuff from diazotized 2-amino-1-hydroxybenzene-4-sulfonic acid amide and 1-(4'-chlorophenyl)-3-methyl-5-pyrazolone and 20.7 parts of the dyestuff from diazotized 2-amino-1-hydroxybenzene-4-sulfonic acid methylamide and 1-acetylamino-7-hydroxynaphthalene, both dyestuffs being in the form of a moist paste (filter cake), are dissolved in 800 parts of water with the addition of 4.0 parts of sodium hydroxide. After the addition of 125 parts of a solution of sodium chromosalicylate having a chromium content of 2.6 percent, the whole is boiled for 4–5 hours under reflux. At the end of this period the formation of the mixed complex is complete. The dyestuff can be precipitated by the addition of sodium chloride and neutralization with acetic acid or by complete evaporation. When dry it is a black powder which dissolves in water with a brown coloration and in concentrated sulfuric acid with a brown-red coloration, and dyes wool from a neutral or weakly acetic acid bath full chocolate brown tints having good properties of fastness.

The corresponding cobalt complex can be made as follows:

20.4 parts of the dyestuff from diazotized 2-amino-1-hydroxybenzene-4-sulfonic acid amide and 1-(4'-chlorophenyl)-3-methyl-5-pyrazolone and 20.7 parts of the dyestuff from diazotized 2-amino-1-hydroxybenzene-4-sulfonic acid methylamide and 1-acetylamino-7-hydroxynaphthalene, both dyestuffs being in the form of a moist paste (filter cake), are dissolved in 800 parts of water with the addition of 8.0 parts of sodium hydroxide. The whole is then heated to 80° C. and mixed with 110 parts of a cobalt sulfate solution having a cobalt content of 2.95 percent. After heating for a short time at 85° C. the formation of the complex is complete. By neutralization with dilute acetic acid and the addition of sodium chloride the dyestuff is precipitated which is the complex cobalt compound containing one atom of cobalt in complex union with substantially two molecules of monoazo-dyestuffs, one of which corresponds to the formula

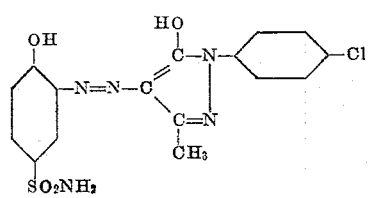

and the other corresponds to the formula

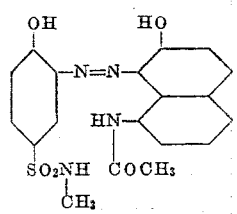

When dry it is a dark brown powder which dissolves in water with a yellow-brown coloration and in concentrated sulfuric acid with a red-brown coloration, and dyes wool from a neutral or acetic acid bath full brown tints having good properties of fastness. The dyestuff is also suitable for dyeing nylon.

In the following table are given further mixed complex chromium and cobalt compounds of ortho:ortho'-dihydroxy-azo-dyestuffs, which can be made by the process described above. In columns I and II are given the two ortho:ortho'-dihydroxy-azo-dyestuffs bound in complex union to the metal given in column III, and in column IV is given the tint of the dyeing with the mixed complex on wool from a neutral or acetic acid bath.

| | I | II | III | IV |
|---|---|---|---|---|
| 1 | 2-Amino-1-hydroxybenzene-4-sulfonic acid amide → 1-(4'-Chlorophenyl)-3-methyl-5-pyrazolone. | 2-Amino-1-hydroxybenzene-4-methyl sulfone → 1-Acetylamino-7-hydroxynaphthalene. | Cr | brown. |
| 2 | ...do... | 2-Amino-1-hydroxybenzene-4-methyl sulfone → 2-Hydroxynaphthalene. | Cr | brownish violet. |
| 3 | ...do... | 6-Acetylamino-4-nitro-2-amino-1-hydroxybenzene → 2-hydroxynaphthalene. | Cr | reddish brown. |
| 4 | ...do... | ...do... | Co | orange-brown. |
| 5 | ...do... | 2-Amino-1-hydroxybenzene-4-sulfonic acid methylamide → 2-Hydroxynaphthalene. | Cr | brownish violet. |
| 6 | ...do... | ...do... | Co | red-brown. |
| 7 | ...do... | 2-Amino-1-hydroxybenzene-5-sulfonic acid amide → 2-Hydroxynaphthalene. | Cr | greyish violet-brown. |
| 8 | ...do... | ...do... | Co | red-brown. |
| 9 | 2-Amino-1-hydroxybenzene-4-sulfonic acid amide → 1-(4'-chlorophenyl)-3-methyl-5-pyrazolone. | 2-Amino-1-hydroxybenzene-4-sulfonic acid anilide → 2-Hydroxynaphthalene. | Cr | violet brown. |
| 10 | ...do... | ...do... | Co | red-brown. |
| 11 | ...do... | 2-Amino-1-hydroxybenzene-4-sulfonic acid amide → 5:8-Dichloro-1-hydroxynaphthalene. | Cr | greyish violet-brown. |
| 12 | ...do... | ...do... | Co | red-brown. |
| 13 | ...do... | 5-Nitro-2-amino-1-hydroxybenzene → 1-Acetylamino-7-hydroxynaphthalene. | Co | yellowish olive. |
| 14 | ...do... | ...do... | Cr | reddish brown. |
| 15 | ...do... | 6-Acetylamino-4-nitro-2-amino-1-hydroxybenzene → 1-Acetylamino-7-hydroxynaphthalene. | Co | brown having an olive shade. |
| 16 | ...do... | ...do... | Cr | violet-brown. |
| 17 | ...do... | 4-Chloro-2-amino-1-hydroxybenzene-5-sulfonic acid amide → 1-(4'-Chlorophenyl)-3-methyl-5-pyrazolone. | Cr | red. |

Example 5

100 parts of a well wetted wool are entered at 40–50° C. into a dyebath which contains in 4000 parts of water 1 part of the chromiferous dyestuff obtainable as described in the first paragraph of Example 1 and 10 parts of crystalline sodium sulfate. 2 parts of acetic acid of 40 percent strength are added, and the bath is raised to the boil in the course of ½ hour and dyeing is carried on at the boil for ¾ hour. The wool is finally rainsed with cold water and dried. There is obtained a full orange dyeing of very good fastness to washing and light.

The same result is obtained without the addition of acetic acid to the dyebath.

Example 6

100 parts of superpolyamide fibers (nylon fibers) are entered at 40–50° C. into a dyebath which contains in 4000 parts of water 1 part of the chromiferous dyestuff obtainable as described in the first paragraph of Example 1 and 10 parts of crystalline sodium sulfate. 3 parts of acetic acid of 40 percent strength are added, and the bath is raised to the boil in the course of ½ hour and dyeing is carried on at the boil for ¾ hour. The fibers are finally rinsed with cold water and dried. There is obtained a full orange dyeing of very good fastness to washing and light.

What is claimed is:

1. A complex metal compound of monoazo dyestuffs free from sulfonic acid and carboxylic acid groups, which contains two monoazo dyestuff molecules so bound in complex union with a metal selected from the group consisting of chromium and cobalt that the ratio of the number of metal atoms bound in complex union to the number of monoazo dyestuff molecules is substantially about 1:2, and in which the monoazo dyestuffs present correspond to the formula

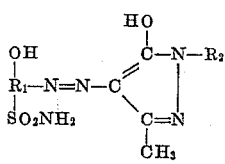

in which $R_1$ represents a benzene radical bound to the azo group in a position vicinal to the hydroxy group and to the $SO_2NH_2$-group in para-position relatively to the azo linkage, and $R_2$ represents a benzene radical, at least one of the radicals $R_1$ and $R_2$ containing a member selected from the group consisting of a lower aliphatic hydrocarbon group, a fluorine, a bromine and a chlorine atom, $R_1$ containing at most one chlorine atom and $R_2$ containing at most two chlorine atoms.

2. A complex chromium compound which contains one atom of chromium so bound in complex union with two monoazo-dyestuffs free from sulfonic and carboxylic acid groups that the proportion of the number of chromium atoms in complex union to the number of monoazo dyestuff molecules is substantially about 1:2, and in which both monoazo-dyestuffs present correspond to the formula

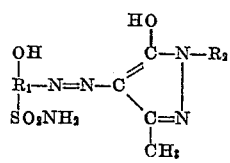

in which $R_1$ represents a benzene radical bound to the azo group in a position vicinal to the hydroxy group and to the $SO_2NH_2$-group in para-position relatively to the azo linkage, and $R_2$ represents a benzene radical, at least one of the radicals $R_1$ and $R_2$ containing a single chlorine atom.

3. A complex chromium compound containing one atom of chromium in complex union with substantially two molecules of monoazo dyestuffs free from sulfonic acid and carboxylic acid groups, both of which correspond to the formula

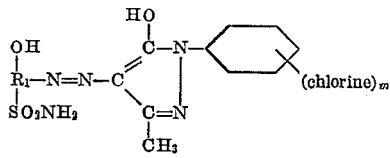

and in which $R_1$ represents a benzene radical bound to the azo group in a position vicinal to the hydroxyl group and to the $SO_2NH_2$-group in para-position relatively to the azo linkage and containing at most one chlorine atom, and $m$ represents a whole number which is at most 2.

4. A complex chromium compound containing one atom of chromium in complex union with substantially two molecules of a monoazo dyestuff free from sulfonic acid and carboxylic acid groups, which corresponds to the formula

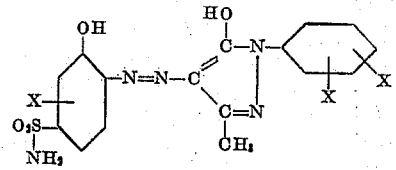

in which at least one and at most two of the X's represents a chlorine atom, the other being hydrogen.

5. A complex cobalt compound which contains one atom of cobalt so bound in complex union with two monoazo dyestuffs free from sulfonic acid and carboxylic acid groups that the proportion of the number of cobalt atoms bound in complex union to the number of monoazo-dyestuff molecules is substantially about 1:2, and in which the monoazo-dyestuffs present correspond to the formula

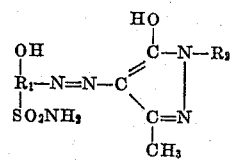

in which $R_1$ represents a benzene radical bound to the azo group in a position vicinal to the hydroxy group and to the $SO_2NH_2$-group in para-position relatively to the azo linkage, and $R_2$ represents a benzene radical, at least one of the radicals $R_1$ and $R_2$ containing a chlorine atom, $R_1$ containing at most one chlorine atom and $R_2$ containing at most two chlorine atoms.

6. A complex chromium compound containing one atom of chromium in complex union with substantially two molecules of monoazo-dyestuffs free from sulfonic acid and carboxylic acid groups, both of which correspond to the formula

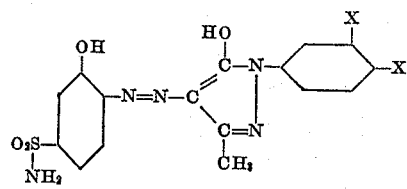

in which one X represents a chlorine atom and the other X a hydrogen atom.

7. A complex chromium compound containing one atom of chromium in complex union with substantially two molecules of monoazo-dyestuffs free from sulfonic acid and carboxylic acid groups, both of which correspond to the formula

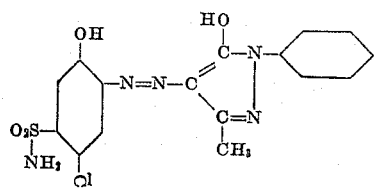

8. The complex chromium compound containing one atom of chromium in complex union with substantially two molecules of the monoazo-dyestuff of the formula

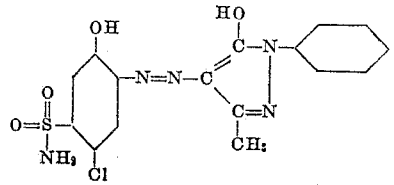

9. The complex chromium compound containing one atom of chromium in complex union with substantially two molecules of the monoazo-dyestuff of the formula

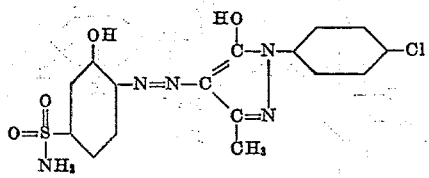

10. The complex chromium compound containing one atom of chromium in complex union with substantially two molecules of the monoazo-dyestuff of the formula

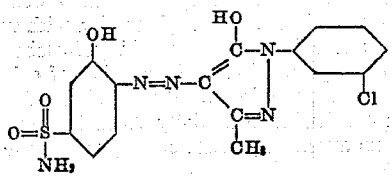

References Cited in the file of this patent

UNITED STATES PATENTS

| | | |
|---|---|---|
| 1,623,005 | Gubler et al. | Mar. 29, 1927 |
| 1,918,938 | Straub et al. | July 18, 1933 |
| 2,012,779 | Straub et al. | Aug. 27, 1935 |
| 2,565,898 | Widmer et al. | Aug. 28, 1951 |
| 2,610,175 | Widmer et al. | Sept. 9, 1952 |
| 2,673,199 | Widmer et al. | Mar. 23, 1954 |
| 2,674,515 | Widmer et al. | Apr. 6, 1954 |